United States Patent [19]

Siegfried, II.

[11] Patent Number: 4,829,488
[45] Date of Patent: May 9, 1989

[54] DRIVE MECHANISM FOR BOREHOLE TELEVIEWER

[75] Inventor: Robert W. Siegfried, II., Richardson, Tex.

[73] Assignee: Atlantic Richfield Company, Los Angeles, Calif.

[21] Appl. No.: 171,711

[22] Filed: Mar. 22, 1988

[51] Int. Cl.$^4$ .............................................. G01V 1/00
[52] U.S. Cl. ..................................... 367/69; 181/105
[58] Field of Search ............... 181/102, 103, 104, 105, 181/106; 367/25, 33, 35, 64, 911, 912; 340/860

[56] References Cited

U.S. PATENT DOCUMENTS 3,614,891 10/1971 Nolte ...................................... 367/35
4,033,429 7/1977 Farr ...................................... 181/106

OTHER PUBLICATIONS

Zemanek et al., The Borehole Televiewer-A New Logging Concept for Fracture Location, Journal of Petroleum Technology, 6, 1969, pp. 762-774.
Moore et al., Development of a New Borehold Acoustic Televiewer for Geothermal Application, Transaction, vol. 9,, Part II, Aug. 1985, pp. 471-473.

Primary Examiner—Brian S. Steinberger
Attorney, Agent, or Firm—Michael E. Martin

[57] ABSTRACT

A borehole televiewer apparatus includes a housing section having a cavity for the disposition of an acoustic signal transmitting and receiving transducer. An elongated threaded rod is disposed in the cavity and held stationary relative to the housing and supports a nut, a slipring assembly, the transducer and a drive motor assembly for axially translating the transducer and rotating the transducer while precluding rotation of the motor and a support plate therefor relative to the rod. The support plate is keyed to the rod by an elongated key and keyway configuration to prevent rotation of the motor and the support plate while permitting axial translation of the motor and support plate along the rod.

10 Claims, 2 Drawing Sheets

DRIVE MECHANISM FOR BOREHOLE TELEVIEWER

BACKGROUND OF THE INVENTION

1. Field of the Invention

The present invention pertains to a drive mechanism for rotating and linearly translating a signal sending and receiving transducer for a downhole tool for providing visual images of a wellbore or casing wall surface.

2. Background

In the art of well drilling and development a useful tool known as the borehole televiewer (BHTV) has been developed. One embodiment of this tool is described in the *Journal of Petroleum Technology*, June, 1969, in an article entitled: "The Borehole Televiewer - A New Logging Concept for Fracture Location and Other Types of Borehole Inspection", by J. Zemanek, et al. This type of tool has proven to be useful for providing certain imaging processes desired for use in well logging operations, identifying induced and natural fractures and other borehole characteristics and for inspecting the wall thickness as well as the exterior and interior wall surface characteristics of well casing and similar types of tubing. This tool utilizes an acoustic pulse signal transmitting and receiving unit or transducer which is rotated substantially continuously to provide a 360° sweep signal pattern or image of the borehole wall surface and other related images. For the sake of this discussion only, the signals generated by the transducer will be referred to as useful for producing "images" of the borehole wall surface. Prior art versions of this tool have utilized a motor driven mechanism for supporting the transducer in a fluid filled cavity within the tool body for rotation about the tool central axis. The entire tool is then linearly traversed during the signal transmitting and receiving process to provide the needed vertical resolution of the "image". Certain improvements in the transducer arrangement have also been disclosed in U.S. Pat. application Ser. No. 07/162,771, filed Mar. 1, 1988 in the name of Steven G. Petermann et al. and assigned to the assignee of the present invention.

However, it has been determined that the degree of vertical resolution required for a suitable image produced by the tool requires relatively precise centering of the tool in the borehole and a steady vertical movement of the transducer during the signal sending and receiving process. Smooth vertical motion of the tool at any acceptable speed with respect to image resolution has proven difficult to achieve in that the tool is typically disposed at the end of an elongated cable several hundred feet or several thousand feet deep in a wellbore. Vertical movement of the tool, accomplished by paying out or reeling in the cable, is subject to substantial fluctuations in tool velocity as well as some lateral motion resulting from the vertical or longitudinal movement of the tool.

Accordingly, it has been determined that it is highly desirable to improve the vertical or longitudinal movement of the transducer with respect to the wellbore during operation thereof to provide a more precise image of the wellbore wall or to improve signal resolution in accordance with the tool's use, whatever it may be. The present invention provides a unique solution to this problem with a drive mechanism and arrangement of a signal sending and receiving transducer for the general type of tool described herein.

SUMMARY OF THE INVENTION

The present invention provides an improved tool for generating images of a wall surface or other signals related to conditions in a subterranean wellbore including portions of the formation which the wellbore penetrates as well as wellbore structures such as casing, risers or drillpipe.

In accordance with one aspect of the present invention, a borehole tool is provided which includes a signal sending and/or receiving transducer which is operated to rotate and simultaneously linearly translate along the borehole relative to a structure which is supported substantially stationary in the borehole to provide improved spatial resolution such as desired in producing an "image" of the borehole wall. In accordance with another aspect of the invention, there is provided an improved acoustic logging tool utilizing a signal sending and receiving transducer which is mounted on a tool frame or housing for combined linear and rotational translation relative to the housing to provide a high resolution image of a borehole wall surface or the wall surface or thickness of a conduit in which the tool is located.

In accordance with the present invention an improved linear and rotational translating transducer is supported on a threaded rod for linear translation therealong by rotating the transducer and a member which is threadedly engaged with the rod so that the transducer rotates as well as linearly translates while the tool housing is held stationary and substantially centered in the borehole to provide a high resolution signal.

Those skilled in the art will recognize the above-described advantages and superior features of the improved tool as well as other aspects thereof upon reading the detailed description which follows in conjunction with the drawing.

DESCRIPTION OF A PREFERRED EMBODIMENT

Figures 1, 3:
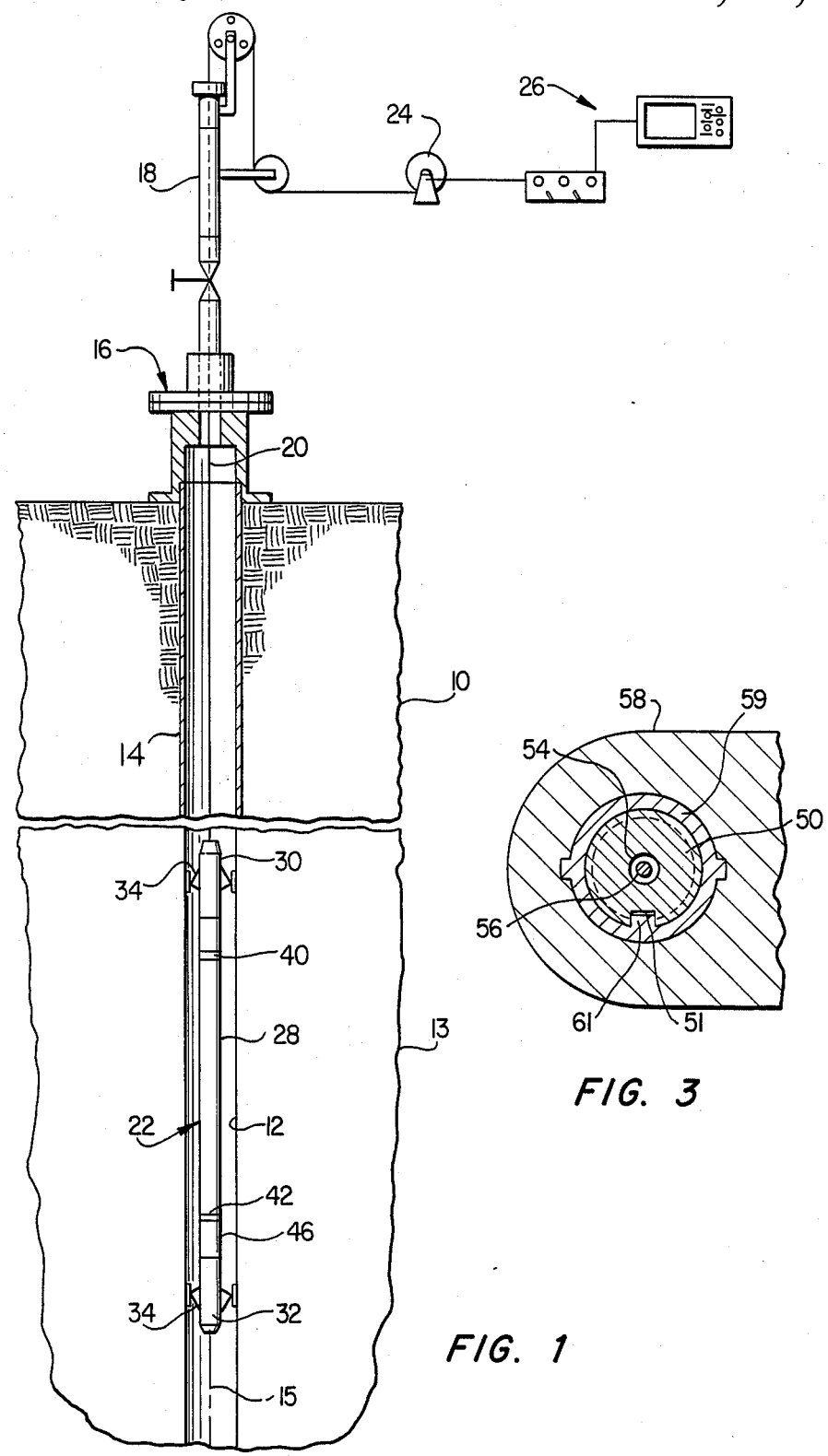
FIG. 1 is a somewhat schematic illustration of the improved tool of the present invention disposed in a wellbore.
FIG. 3 is a detail section view taken generally along the line 3—3 of FIG. 2.

In the description which follows, like parts are marked throughout the specification and drawing with the same reference numerals, respectively. The drawing figures are not necessarily to scale and certain elements are shown in rather generalized form in the interest of clarity and conciseness.

Referring to FIG. 1, there is illustrated an earth formation 10 into which a borehole 12 has penetrated. The borehole 12 may comprise a subterranean wellbore for the production of or injection of fluids with respect to a zone of interest 13. A casing 14 extends at least partly into the wellbore and is connected to a suitable wellhead 16 having suitable apparatus such as a lubricator 18 for insertion and withdrawal of wireline tools and the like. As shown in FIG. 1, an elongated wireline cable 20 extends through the lubricator 18 into the borehole 12 and is connected to an improved borehole imaging or logging tool generally designated by the numeral 22. The wireline 20 extends through the top of the lubricator 18 and is trained over suitable means for reeling in and paying out the wireline cable including a powered storage drum 24. Suitable signal transmitting and receiving apparatus 26 is operably connected to the wireline cable 20 for operating the tool 22 and receiving data therefrom.

The tool 22 may be of a type generally referred to hereinabove in connection with the reference to the *Journal of Petroleum Technology*. The tool 22 includes a frame or housing section 28 including a relatively thin walled tubular member 29 which functions as a signal transmitting window for internally disposed signal transmitting and receiving devices to be described in further detail herein. The tool 22 also includes opposed head members 30 and 32 which are adapted to include radially extendable and retractable centralizing arms 34 which are operable to center the tool 22 substantially coaxial with the central longitudinal axis 15 of the wellbore 12. The centralizing arms 34 may be of a conventional type including the so-called bow spring arms or of a type which may be mechanically or hydraulically operated to extend or retract, at will, for substantially axially centering and locking the tool with respect to the borehole wall.

Figure 2:
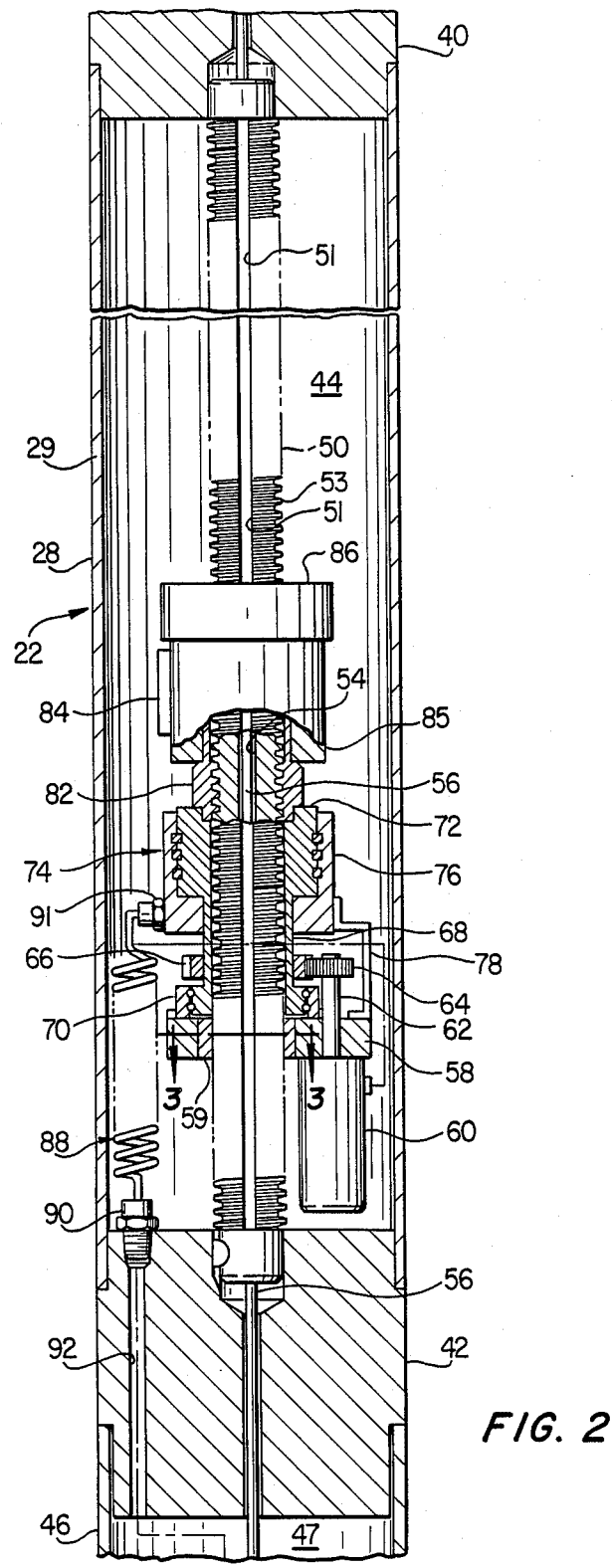
FIG. 2 is a detail longitudinal central section view of the transducer drive and support mechanism of the present invention.

Referring now to FIG. 2, the member 29 of the intermediate housing section 28 is suitably connected at its opposite ends to bulkhead parts 40 and 42 to form a fluid filled cavity 44. A housing portion 46, disposed below the cavity 44, in the normal attitude of the tool 22, includes a suitable bay 47 for housing certain electrical circuitry, not shown, for the tool 22. An elongated, externally threaded cylindrical rod 50 extends within the cavity 44 from one end to the other and is supported by and is nonrotatable relative to the bulkhead parts 40 and 42. The rod 50 includes external power screw threads 53 thereon and a central bore 54 extending therethrough serving as a cableway for suitable electric wiring indicated by the bundled cable 56. The cable 56 extends also through suitable bores formed in the bulkhead parts 40 and 42 and into the bay formed in the housing part 46. The cable 56 is suitably connected to the wireline cable 20 for conducting electrical signals between the tool 22 and the apparatus 26. The rod 50 also includes an external elongated axial keyway 51 extending substantially the length of the rod between the bulkhead parts 40 and 42.

Referring further to FIG. 2, the rod 50 is adapted to support a member comprising a support plate 58 for an electric motor 60. The motor 60 includes a rotary output shaft 62 drivably connected to a pinion 64. The pinion 64 is meshed with a gear 66 which is connected to and suitably secured for rotation with a hub member 68 sleeved over the rod 50 and operably connected to a combined axial and thrust load accepting bearing assembly 70. The hub member 68 is also suitably connected to or formed integral with the rotor 72 of a slipring assembly 74. The slipring assembly 74 may be of a type commercially available and comprising basically a rotor member such as the rotor 72 and a stator member 76. The stator member 76 is operably connected to the support plate 58 by suitable bracket means 78 and the support plate 58 and the stator member 76 are nonrotatable relative to each other. As shown in FIG. 3, the support plate 58 includes means to permit axial translation of the support plate along the rod 50 including a bushing 59 secured to the support plate and having a key portion 61 in registration with the keyway 51. The support plate 58, motor 60 and stator 76 thus are axially movable along but nonrotatable relative to the rod 50.

As further shown in FIG. 2, the bearing 70 is suitably connected to the support plate 58 and the hub member 68. Moreover, the rotor member 72 is operably connected to an internally threaded member or nut 82 which is threadedly engaged with the rod 50. The nut 82 is also suitably coupled to a signal transmitting and receiving device or transducer 84 which is operable to transmit acoustic signal pulses through the cavity 44 and the window member 29 to be reflected back from the borehole wall and received at the transducer for transmission of a suitable signal for conversion and storage or display and representing certain characteristics including an "image" of a portion of the borehole wall as discussed previously herein. The transducer 84 is supported by a suitable member 85 disposed on the rod 50 in sleeved relationship thereover. A suitable magnetometer means 86 is adapted for rotation with the transducer 84 and is also disposed in sleeved relationship over the rod 50 and operably coupled to the nut 82 for rotation therewith. The magnetometer 86 is operable to provide a suitable electrical signal indicating the azimuthal position of a signal received by the transducer 84 so that correlation of the "image" generated by the transducer 84 with the actual location in the borehole may be obtained.

The signals transmitted to and from the transducer 84 and the magnetometer 86, as required for operation of the tool 22, are transmitted between the slipring assembly 74 and circuit means, not shown, by a suitable flexible, coiled electrical cable 88 having a sufficient number of electrical conductors therein for performing the functions required of the transducer and the magnetometer, for example. The coiled cable 88 is secured at its lower end to the bulkhead part 42 by a fitting 90 and its conductors extend through suitable passage means 92 in the bulkhead part to the housing section 46. A fitting 91 secures the opposite end of the cable 88 to the slipring stator 76. The coiled cable 88 is provided with an elastic memory which allows the cable to be extended and retracted axially within the cavity 44 as the slipring assembly 74 and the associated mechanism including the transducer 84 and the magnetometer 86 traverse the cavity along the rod 50. The cable 88 may also include suitable conductor means for operating the motor 60.

By way of example, by driving the transducer 84 at a rotational speed of approximately three revolutions per second and with 500 image producing signals being obtained per revolution, if the rod 50 is provided with threads 53 of a pitch of fifteen threads per inch of rod length, a vertical image resolution would be obtained similar to the horizontal resolution for typical wellbore diameters. Moreover, within approximately ten minutes of operating time, a ten foot length of borehole interval could be imaged by the tool 22 while secured stationary in the borehole. The motor 60 is desirably of a reversible type wherein certain areas of the borehole may be traversed by the transducer 84 a selected number of times to more closely examine a particular area of interest and, of course, the transducer may be returned to its starting point after each operation.

The operation of the improved tool 22 is believed to be readily understandable to those skilled in the art from the foregoing description. However, briefly, upon locating the tool 22 in a desired region of the borehole 12, the centralizer arms 34 would be extended to firmly position the tool generally centrally with respect to the axis 15 and to prevent linear traversal of the tool, during operation, with respect to the borehole. The transducer 84 and the connected structure including the slipring assembly 74, the support plate 58 and the motor 60 would typically be positioned at the lower or upper end of the cavity 44. The cavity 44 may be filled with a suitable fluid which will permit acoustic coupling of the transducer 84 with the borehole wall through the housing member 25 and fluid present in the borehole 12. Simultaneously, with operation of the transducer 84 to send and receive acoustic pulses and operation of the magnetometer 86 to determine azimuthal position of the transducer, the motor 60 would be operated to rotate the gear 66, hub 68, the rotor 72 and the nut 82 together with the transducer 84 and the magnetometer 86 to rotatably scan the borehole 12.

As the nut 82 rotates relative to the rod 50 it would also effect linear translation of the entire mechanism mounted on the rod between the bulkhead parts 40 and 42 in timed relationship with rotation of the transducer 84. Thanks to the provision of the bushing 59, including the integral key part 61 which is in registration with the keyway 51, the support plate 58 and the slipring stator 76 translate axially with the mechanism supported on the rod 50 but do not rotate relative to the rod. As the slipring assembly 74 translates along the rod 50, the coiled cable 88 will extend to accommodate this linear traversal and the elastic memory built into the cable will cause it to resume its coiled shape as the mechanism moves toward the bulkhead part 42. The relatively smooth axial translation of the transducer 84 in timed relationship to its rotation within the parameters set forth herein provides a significantly improved image of the borehole 12 as well as any structure such as the casing 14 in which the tool 22 may be disposed for operation.

The modified borehole imaging tool 22 in accordance with the present invention may be fabricated using conventional engineering materials and in some respects commercially available components, including those which have not been described in substantial detail herein. Moreover, the rod 50 may be supported for extension from one end of the tool 22 if the mechanism for rotating and linearly translating the transducer 84 is adapted to operate in the borehole fluid instead of the fluid filled cavity 44.

Although a preferred embodiment of the present invention has been described herein, those skilled in the art will recognize that various substitutions and modifications may be made to the specific embodiment disclosed without departing from the scope and spirit of the invention as recited in the appended claims.

What I claim is:

1. In a borehole tool for generating signals indicating a condition of structure defining a borehole, including a rotatable transducer for transmitting and receiving signals relative to said structure, the improvement characterized by:
   housing means for said tool;
   an elongated support member supported by said housing means;
   a support plate disposed on said support member and movable axially relative to said support member, said transducer being operably connected to said support plate for movement with said support plate axially relative to said support member;
   motor means connected to said support plate; and
   means engaged with said support member and operably connected to said transducer and said motor means for axially translating said transducer and rotating said transducer relative to said support member in timed relationship, one to the other, in response to operation of said motor means to provide a circumferential and axially extending transducer signal pattern along a portion of said borehole in which said tool is disposed.

2. The tool set forth in claim 1 wherein:
   said support member comprises an elongated rod having external threads formed thereon and said means engaged with said support member includes a nut threadedly engaged with said rod and rotatable relative to said rod to provide for axial translation in timed relation to rotation of said transducer.

3. The tool set forth in claim 1 including:
   a slipring assembly disposed around said support member and operably connected to conductor means connected to said housing means for transmitting signals to and from said transducer.

4. The tool set forth in claim 2 wherein:
   said motor means is drivably connected to said nut through gear means for rotating said nut to axially translate said transducer while rotating said transducer with respect to said support member.

5. The tool set forth in claim 4 including:
   means for engagement of said support plate with said support member for precluding the rotation of said support plate relative to said support member while permitting axial sliding movement of said support plate along said support member.

6. The tool set forth in claim 1 including:
   means for securing said tool against axial movement in said borehole.

7. The tool set forth in claim 3 including:
   flexible conductor means secured to said housing means and operably connected to said slipring assembly for extension with said slipring assembly along said support member during axial translation of said transducer.

8. In a tool for generating signals indicating an image of structure defining a borehole along a predetermined axial and circumferential extent of said borehole, the improvement characterized by:
   housing means including a housing section defining an elongated generally cylindrical cavity;
   an elongated generally cylindrical threaded rod extending within said cavity and secured stationary relative to said housing section;
   a support member disposed on said rod for axial translation therealong;
   a nut member threadedly engaged with said rod and drivably connected to motor means supported by said support member for rotation relative to said rod and axial translation relative to said rod in response to operation of said motor means;
   an acoustic transducer for transmitting and receiving signals, said transducer being operably disposed on said rod and connected to said nut member for rotation and axial translation therewith;
   a slipring assembly disposed in sleeved relationship over said rod for transmitting electrical signals to and from said transducer;
   electrical conductor means interconnecting said transducer and said slipring assembly; and means operably associated with said rod and said support member to prevent rotation of said support member relative to said rod while permitting axial translation of said motor means, said support member, said nut, said transducer means and said slipring assembly axially along said rod.

9. In a tool for generating signals indicating an image of structure defining a borehole along a predetermined axial and circumferential extent of said borehole, the improvement characterized by:

housing means;

an elongated generally cylindrical threaded rod secured stationary by and extending axially relative to said housing section means;

a support member disposed on said rod for axial translation therealong;

a nut member threadedly engaged with said rod and drivably connected to motor means for rotation relative to said rod and axial translation relative to said rod in response to operation of said motor means;

an acoustic transducer for transmitting and receiving signals, said transducer being operably connected to said nut member for rotation and axial translation therewith;

a slipring, assembly disposed in sleeved relationship over said rod for transmitting electrical signals to and from said transducer; and electrical conductor means interconnecting said housing means and said slipring assembly; and means operably associated with said rod and said support member to prevent rotation of said support member relative to said rod while permitting axial translation of said support member, said nut, said transducer means and said slipring assembly axially along said rod.

10. In a borehole tool for generating signals indicating a condition of structure defining a borehole, including a rotatable transducer for transmitting and receiving signals relative to said structure, the improvement characterized by:

housing means for said tool;

an elongated rod having external threads formed thereon and supported by said housing means;

a support plate disposed on said rod and movable axially relatively to said rod, said transducer being operably connected to said support plate for movement with said support plate axially relative to said rod;

an elongated axial keyway in said rod and key means on said support plate and in registration with said keyway for precluding the rotation of said support plate relative to said rod while permitting axial sliding movement of said support plate along said rod;

a nut threadedly engaged with and rotatable relative to said rod and operably connected to said transducer; and motor means connected to said support plate and drivably connected to said nut through gear means for rotating said nut to axially translate said transducer while rotating said transducer relative to said rod in timed relationship, one to the other, to provide a circumferential and axially extending transducer signal pattern along a portion of said borehole in which said tool is disposed.

* * * * *